United States Patent [19]
Brinks, Jr.

[11] Patent Number: 5,996,454
[45] Date of Patent: Dec. 7, 1999

[54] ZERO RUN-OUT BRAKE LATHE ADAPTER

[76] Inventor: James Ronald Brinks, Jr., 4278 Grafton Rd., Brunswick, Ohio 44212

[21] Appl. No.: 09/012,449

[22] Filed: Jan. 23, 1998

[51] Int. Cl.⁶ ..................................................... B23B 5/02
[52] U.S. Cl. ................................. 82/151; 82/1.11; 82/112
[58] Field of Search ............................. 82/112, 151, 157, 82/162, 101, 152, 1.11

[56] References Cited

U.S. PATENT DOCUMENTS

| | | | |
|---|---|---|---|
| 4,165,662 | 8/1979 | Besenbruch et al. | 82/40 |
| 4,493,231 | 1/1985 | Wossner | 82/4 A |
| 4,708,041 | 11/1987 | Granger | 82/40 R |
| 5,224,303 | 7/1993 | Baldwin | 51/217 |
| 5,560,271 | 10/1996 | Duty | 82/112 |
| 5,615,589 | 4/1997 | Roach | 82/112 |
| 5,653,153 | 8/1997 | Greenwald | 82/1.11 |
| 5,737,985 | 4/1998 | Rimlinger, Jr. | 82/165 |

*Primary Examiner*—Daniel W. Howell
*Assistant Examiner*—Mark Williams
*Attorney, Agent, or Firm*—Gipple & Hale

[57] ABSTRACT

A lathe adapter/apparatus for reshaping surfaces of a brake rotor and eliminating run-out comprising an adapter plate assembly mounted on an adapter mounting member with a first fixed plate of the plate assembly defining a first planar end surface perpendicular to the axis of adapter mounting member and a second planar end surface that forms an angle with the axis. A movable plate is mounted on the adapter mounting member adjacent the fixed plate, the moveable plate defining a first planar end surface perpendicular to the axis of the adapter mounting member and a second planar end surface that forms an angle with the axis, the angled end surface of the first movable plate member engaging the angled end surface of the first fixed plate. A second plate assembly having plates with end surfaces substantially identical to the first plate assembly is mounted on the adapter mounting member and a cone and spring centering assembly is mounted on the adapter mounting member between the first and second plate assemblies for centering a brake rotor which is mounted on the adapter mounting member between the plate assemblies.

20 Claims, 8 Drawing Sheets

ZERO RUN-OUT BRAKE LATHE ADAPTER

FIELD OF THE INVENTION

The present invention relates generally to methods and apparatus for correcting disc brake rotor run-out and in particular to an adapter used on a lathe to zero or eliminate disc brake run-out and a method for eliminating brake run-out using the same.

BACKGROUND OF THE INVENTION

Motor vehicle brakes often utilize a plurality of opposing, pairs of pads on brake calipers to frictionally engage a rotor disc which is secured to and rotates with a vehicle wheel in a manner well known in the art. Preferably the braking surfaces of the rotors are planar and are oriented to be perpendicular to the axis of rotation of the vehicle wheel. Brake rotors are typically disc-shaped structures having two oppositely facing ring-shaped planar braking surfaces. Ideally, these two ring-shaped braking surfaces should be parallel, perfectly planar and should be mounted with respect to the axis of rotation of the vehicle wheel so that the two rotating parallel surfaces are perpendicular to the axis at all times.

In practice this ideal configuration is difficult to realize because the stacked tolerances of the hub and rotor assemblies, known in the industry as the "hubless rotor," frequently cause a wobbling of the disc brake rotor on the mounted running assembly, a condition that is commonly referred to as "run-out." In recent years, automobile manufacturers have been plagued with an increased incidence of excessive run-out, which commonly manifests itself in the form of increased brake pedal pulsation problems. Excessive run-out results in reduced braking efficiency and often in the premature wearing out of the brakes. Lateral disc run-out refers to lateral deviation of the planar surface of a rotor along a radial line perpendicular to the longitudinal axis of rotation of the rotor from a plane extending through the radial line and perpendicular to the axis of rotation. The lateral run-out may not be the same on the two oppositely-facing planar braking surfaces defined by the brake rotor and, therefore, the run-out on each side must be measured and eliminated for proper brake functioning.

A number of devices have been devised and are well known in the art to help correct defects and deviations in the surfaces of brake rotors. One example is U.S. Pat. No. 4,165,662 to Besenbruch et al. which is directed toward a work holder assembly including adapter members having conical faces for engaging a disc brake therebetween or for engaging in a central hole of a disc. A rigid circular plat, with spaced threaded adjustable bolts bears on the face of the disc. Spacer members bear against the circular plate while the adapter members, plate and spacer members are disposed in axial alignment on the shaft. The rigid circular plate and adjustment bolts hold the work piece in axial alignment with the shaft, and correct distortion in the disc or end wall of the drum while preventing vibration of the work piece during dressing.

Another device is shown in U.S. Pat. No. 4,455,900 issued to Callanan et al. for a brake lathe used for refinishing the inner cylindrical surface on a brake drum of the two outer side surfaces on a brake disc. The brake lathe has an indexable spindle so that its tool slide only needs to move in one direction so that the part being worked upon, be it a brake drum or a brake disc, can be oriented to the direction of movement of the tool slide.

Another device for turning a brake surface is disclosed in U.S. Pat. No. 3,691,880 issued to Ratteree et al. which describes a method and apparatus for turning the braking surfaces of a vehicle lug supported braking member, such as a brake drum or disc brake. The brake turning method includes the steps of supporting the braking member on a refinishing lathe so that its lug holes are concentric with respect to the rotational axis of the lathe, rotating the braking member, and engaging the braking surface of the member with the lathe cutting tool maintained at selected distances from the axis of rotation to redefine the braking surface concentric with respect to the circle defined by the lug holes in the braking member. The apparatus includes a backing plate which is carried by the lathe which defines an annular groove in the working face adapted to lie behind the lug holes and a clamping plate also adapted to be carried by the lathe in juxtaposition with the backing plate. The clamping plate is provided with a plurality cf support pins arranged to project through the lug holes of the braking member which is positioned between the clamping and backing plates to position the member concentrically about the rotational axis of the lathe.

A swing arm brake lathe is described in U.S. Pat. No. 5,099,728 issued to Thiem. The brake lathe is for machining both brake drums and brake rotors wherein the tool carriage assembly is pivotable through an arc of about ninety degrees which allows the tool carriage to engage the friction surfaces of either a brake drum or rotor on a fixed spindle. In the drum machining position, the tool carriage assembly is approximately parallel to the axis of the spindle and when in the disc machining position the tool carriage assembly is approximately perpendicular to the axis of the spindle. The lathe further includes alignment means to assure proper alignment of the tool carriage assembly without the spindle, and release means to remove the tool carriage assembly from the remainder of the lathe for service.

U.S. Pat. No. 4,493,231 issued to Wossner describes a method and device for machining brake discs while the discs are still on the vehicle. The refacing of the worn brake discs is accomplished by connecting an outer drive with the disc or with the shaft on which the disc is mounted. This positions the machine tools with respect to the disc for refacing the disc. Two adjustable tools are fixed on a common transverse carriage and simultaneously machine two faces of the disc. Coupling and centering devices are arranged on either side of the refacing device and may be coupled consecutively with the disc on the two sides of the vehicle.

Other examples of machines and methods for correcting brake problems include U.S. Pat. No. 5,095,786 issued to Belinghausen et II., U.S. Pat. No. 4,266,454 issued to Mitchell et al., U.S. Pat. No. 3,260,137 issued to Obmann and U.S. Pat. No. 3,540,165 issued to Lanham. The '786 patent is directed to a method and apparatus for dampening brake lathe vibration. The '454 device discloses a method and an apparatus for dampening vibrations during the turning of a rotor by means of a pair of weights which respectively lie in inclined tracks and are held against the opposite faces of the disc by the force of gravity. The '137 patent discloses a device for unbalance correction of rotors and the '165 device is directed to rotatably holding a braking member having opposed braking surfaces for machining the surfaces.

The prior art does not provide an effective way to eliminate a common and potentially destructive problem; namely, the problem of how to easily eliminate disc brake rotor run-out. The present invention discloses a device and a method using the device for measuring a rotor for evidence of run-out before the rotor is removed from the vehicle, accurately marking the high portion of the rotor surface and then marking both the rotor and a portion of the vehicle hub to enable a service technician to replace the rotor in the same orientation after it has been removed and lathed to resurface the rotor. The inventive device enables the service technician to easily remove the surface defects on the rotor and comprises a brake lathe adapter that includes an adapter mounting, arbor and two pairs of adapter plates which are mounted on the adapter mounting arbor, each pair of adapter plates comprising a fixed plate and a rotatable plate. The fixed plates are mounted toward the respective ends of the mounting arbor and the moveable plates are mounted inside the fixed plates. Each plate has one offset or angled flat side surface that has been machined or cut at a one degree (1°) angle and the pairs of plates are arranged on the mounting arbor so that the angled sides are adjacent. The rotor is mounted between the two movable inner plates and they are rotated on the mounting arbor to compensate for the rotor run-out before a rotor surface is lathed.

SUMMARY OF THE INVENTION

The correct way to eliminate rotor run-out is to refinish the surface of the rotor to remove the high portion on the surface and restore the surface to a planar configuration. However, merely planing the surface of the rotor is not sufficient to solve the problem because the tolerances must be reduced as close to zero as possible at the same time to prevent the problem from recurring. In order to reduce or "zero out" the tolerances, it is necessary to replicate the orientation of the rotor with respect to its axis of rotation when it is installed on the vehicle hub by similarly orienting the rotor with respect to the axis of rotation of the arbor on the lathe. To accomplish this with precision and ease, the subject invention adapter assembly can be installed on most lathes that are used to machine metal mechanical parts. This lathe adapter enables the vehicle service technician to use a simple method to orient the rotor properly on the arbor of the lathe to zero out the tolerances and prevent run-out from recurring. The adapter assembly of the present invention includes a pair of specially configured fixed offset plates, a pair of specially configured movable offset plates, an adapter mounting arbor, an adapter tension spring member, an adapter centering cone member and an adapter locking nut. This assembly is mounted on an arbor of a lathe and is used to receive and properly orient a brake member having a rotor surface and to eliminate run-out while the rotor surface is being restored.

Accordingly, it is an object of the present invention to provide the motor vehicle service technician with a device and a method for easily replicating the orientation of an installed rotor surface on an arbor of a lathe to eliminate simultaneously the run-out in the rotor surface and the stacked tolerances in the stacked hub and rotor assembly which will cause run-out to recur.

It is a further object of the present invention to provide the vehicle service technician with an adapter that can be easily installed on existing brake lathes to orient a rotor surface of a rotor being resurfaced to simultaneously eliminate surface imperfections including run-out and stacked tolerances in the assembled hub and rotor.

In the accompanying drawings, there is shown an illustrative embodiment of the invention from which these and other objectives, novel features arid advantages will be readily apparent.

DETAILED DESCRIPTION OF THE INVENTION

Figures 14, 15:
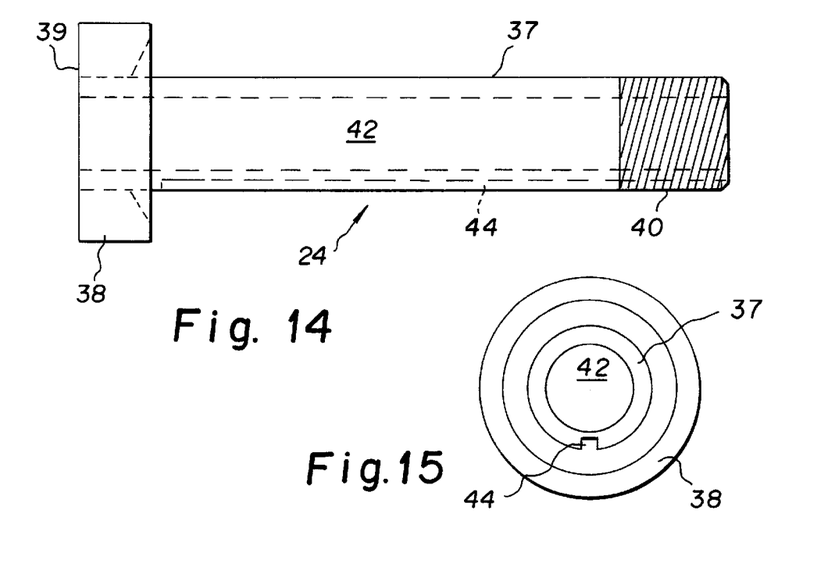
FIG. 14 is an enlarged side elevational view of an adapter arbor for the brake lathe adapter.
FIG. 15 is an end view of an adapter arbor for FIG. 14.
Figure 16:
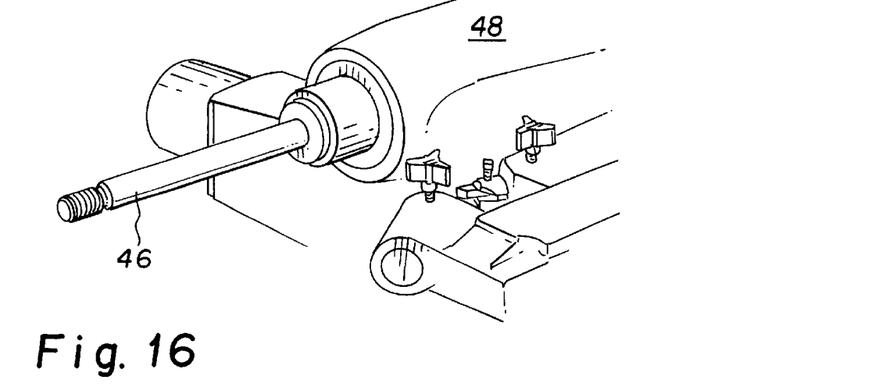
FIG. 16 is a perspective view of a standard machine lathe.
Figure 17:
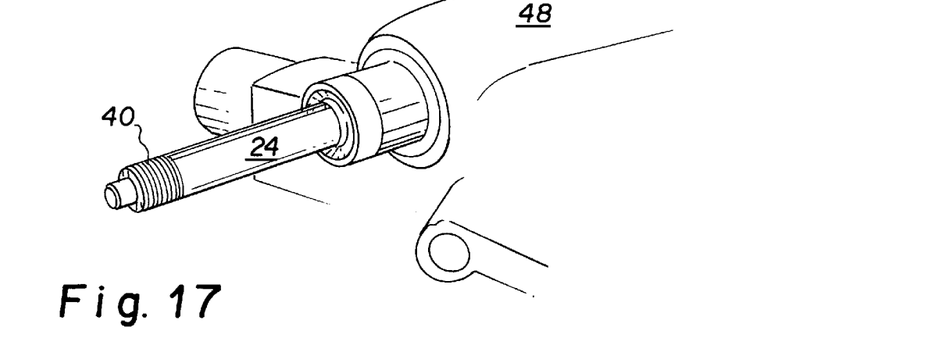
FIG. 17 is a perspective view of the adapter arbor mounted on the shaft of the lathe shown in FIG. 16.
Figure 18:
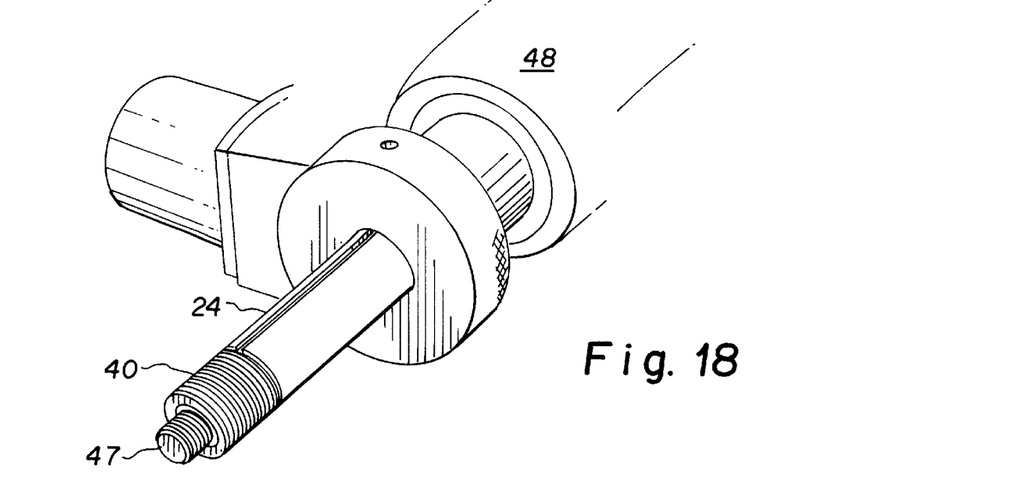
FIG. 18 is a perspective view of a fixed plate mounted on the adapter arbor.
Figure 19:
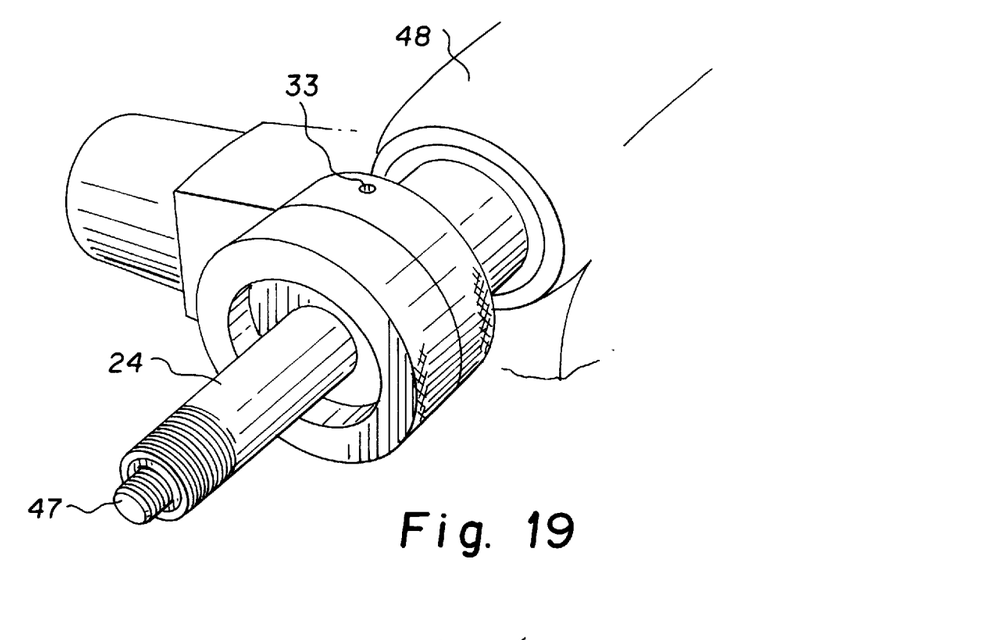
FIG. 19 is a perspective view of a moveable plate mounted adjacent to the fixed plate on the adapter arbor.

The preferred embodiment and best mode of the invention, there is shown in FIGS. 1 through 22 a zero run-out brake lathe adapter assembly 20. The zero run-out brake lathe adapter assembly 20 includes an adapter mounting arbor 24, a plurality of adapter fixed offset plate members 26 and 26a, a plurality of adapter movable offset plate members 28 and 28a, an adapter locking nut member 30, an optional adapter spacer member 32, an adapter centering cone member 34 and an adapter tension spring member 36. Each of the respective fixed plate members 26, 26a, and moveable plate members 28, 28a forms a paired plate assembly 27. As best seen in FIGS. 14, 15, and 17, the adapter mounting arbor 24 is a tubular member 37 with a circular base plate 38 located at a proximal end and, a threaded portion 40 formed at a distal end. The end planar surface 39 of the base plate 38 abuts the brake lathe 48. The tubular member 37 has a throughgoing cylindrical lumen 42 and is provided with a longitudinally extending key slot 44 cut in the exterior surface of the tubular member running from the base plate 38 to the threaded portion 40. The lumen 42 of the mounting arbor 24 is appropriately dimensioned to snugly receive the arbor member or shaft 46 of a brake lathe 48 and is secured thereto by an arbor nut 50 that is part of the brake lathe 48 and is threadably mounted to the distal threaded end 47 of the shaft 46.

Figure 11:
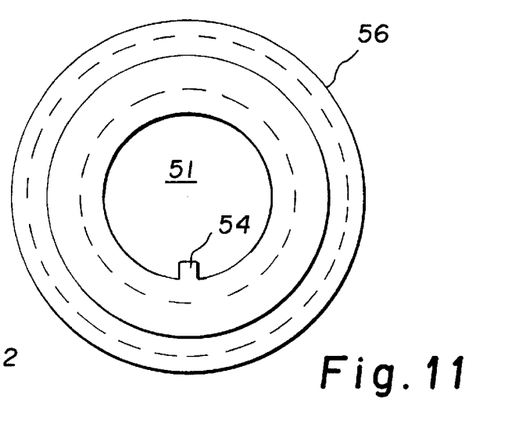
FIG. 11 is an end view of the fixed plate member of FIG 10.
Figure 12:
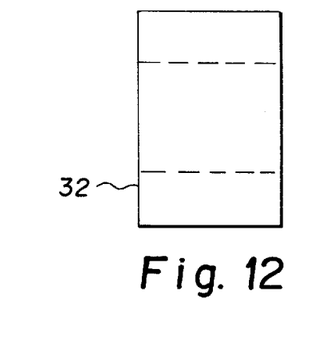
FIG. 12 is an enlarged side elevational view of a spacer for the brake lathe adapter.
Figure 13:
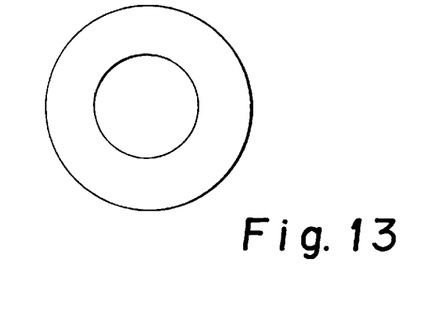
FIG. 13 is an end view of the spacer of FIG. 12.

A first or inside adapter fixed offset plate 26 is fixedly mounted on the proximal end of the adapter mounting arbor 24 by placing the mounting arbor through the bore 51 in the adapter fixed offset plate 26 so that a perpendicular or non-angled planar end surface 52 of the adapter fixed offset plate 26 is facing the brake lathe 48 adjacent the base plate 38. An angled end surface 53 of the adapter fixed offset plate 26 is then facing toward the distal end 40 of the adapter mounting arbor 24. The bore 51 of the adapter fixed offset plate 26 is provided with a protruding spline or key member 54 as shown in FIG. 11 which mates or fits in the key slot or groove 44 cut in the outer surface of the adapter mounting arbor 24 to hold the fixed offset plate 26 in a fixed relation therewith. The Fixed plate is kept from moving longitudinally on the adapter mounting arbor 24 by a set screw 33. The cylindrical outside surface 56 of the adapter fixed offset plate 26 is provided at the widest point thereof with a longitudinally extending indicator groove 58 which is positioned so that when the adapter fixed offset plate 26 is installed on the adapter mounting arbor 24, the groove faces upward in easy view of the operator using the brake lathe 48. The indicator groove 58 extends longitudinally because it is parallel to the axis of rotation of the brake lathe. The indicator groove 58 extends along the entire width of the adapter fixed offset plate 26 from the non-angled perpendicular end surface 52 to the angled end surface 53 thereof. This groove 58 is sometimes referred to as the "zero position indicator."

A second fixed plate 26a is also included in the zero run-out brake lathe adapter 20 and the two fixed plates 26 and 26a have identical structures. The non-angled face 52 of each adapter fixed offset plate 26 and 26a is machined to form a flat perpendicular surface that is perpendicular to the longitudinal axis of the bore 51 and the angled face 53 of each plate is machined to form a flat surface that is inclined at an angle ranging from 1° to 5° with respect to the perpendicular non-angled surface 52. In the preferred embodiment of the invention the angle is about 1°. The drawings show an exaggerated angle to indicate the angled surface as a 1° angle would not be ascertainable. The fixed plates 26 and 26a can also each include an annular raised portion 60 on the transverse face 52 and an annular groove 62 formed on the angled face.

Identically constructed first and second adapter movable offset plate members 28 and 28a are included in the run-out assembly 20 and are respectively paired with fixed plates 26 and 26a. Each movable plate member 28 includes an angled end face 64 and a perpendicular or non-angled end face 66. The perpendicular face 66 of the movable plate member is provided with a cylindrical tapered recess 65 and the base of the recess 65 is provided with an annular groove 67 to receive an end coil of the adapter tension spring member 36. The movable offset plate members 28 and 28a are each provided with a throughgoing bore 68 which is axially aligned with bore 51 of the fixed plate. The face surface or rim 66 of each movable plate is flat and perpendicular to the longitudinal axis of each bore 68. The angled end surface 64 of each adapter movable offset plate member 28, 28a is flat and machined to form an angled surface ranging from 1°–5°. Preferably one degree (1°) angle is used with the plane defined by the non-angled perpendicular end surface 66. The movable offset plate member 28 is rotatably mounted on the adapter mounting arbor 24 so that the angled face 64 of the first adapter movable offset plate member 28, 28a is adjacent the angled face 53 of the adapter fixed offset plate 26/26a and the rim 66 perpendicular to the bore 68 is facing toward the brake rotor or distal end of the adapter mounting arbor 24.

When the two plate members 26 and 28 are mounted on the adapter arbor 24, the first adapter movable offset plate member 28 can be rotated until it is oriented relative to the first adapter fixed offset plate member 26 so that the longitudinally shortest side portion of the movable plate member 28 is longitudinally aligned with the longitudinally longest side portion of the fixed plate member 26 and vice versa. This configuration is shown in side view in FIG. 4 and, when the two members are thus oriented, the proximal or non-angled side of the fixed plate member 26 is parallel to the non-angled side of the movable plate member 28 and perpendicular to the axis of the arbor 24. The outer surface of the movable plate member is provided at its longitudinally narrowest portion with a plurality of indicator notches 29 cut into the surface at 0.005 inch increments and numbered from 0.000 inches to 0.025 inches. When the two plates are oriented as noted above in this way, these regularly spaced notches on the movable plate member are adjacent the zero position indicator groove 58 on the fixed plate member. The purpose for these markings and the reasons for this particular alignment thereof will be described below when the operation of the adapter is discussed.

Figure 1:
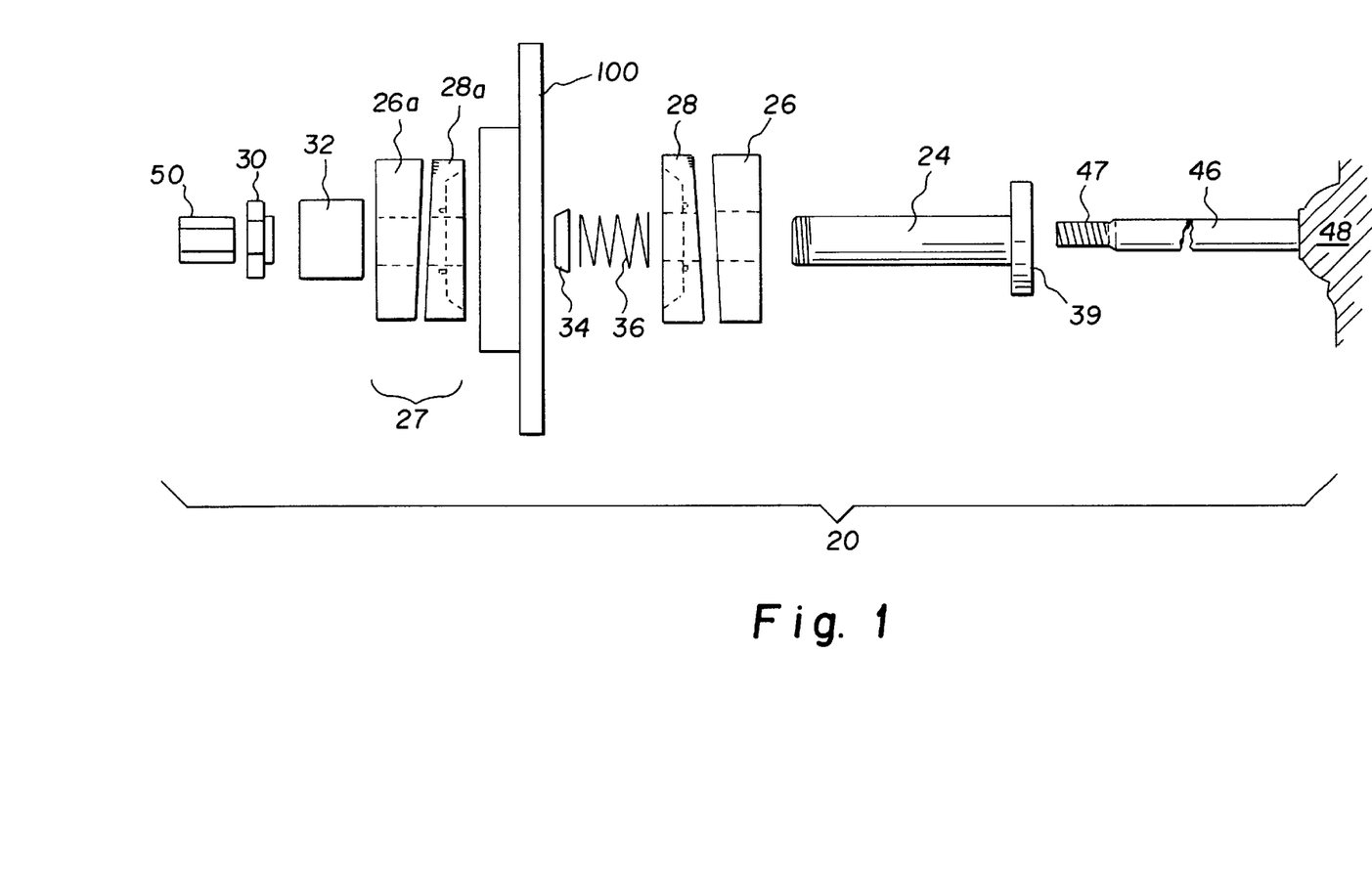
FIG. 1 shows an exploded view of the zero run-out brake lathe adapter invention with a brake rotor.
Figure 2:
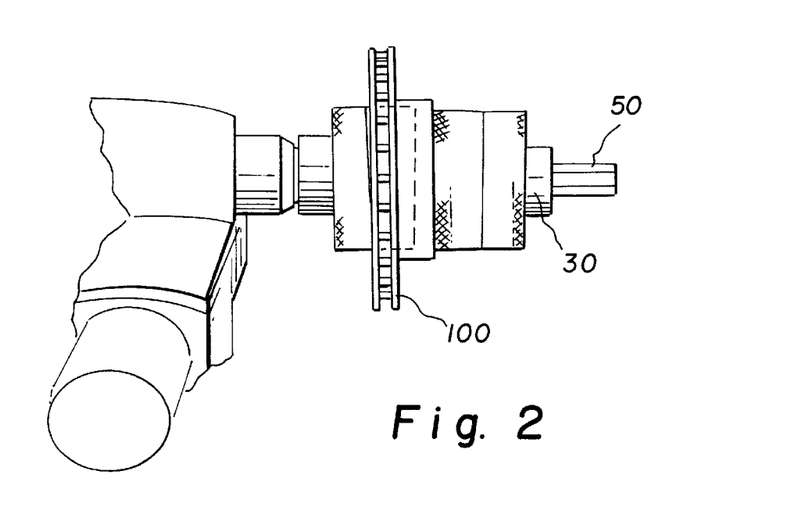
FIG. 2 shows a side elevational view of the brake lathe adapter and a brake rotor mounted on the lathe shaft.
Figure 3:
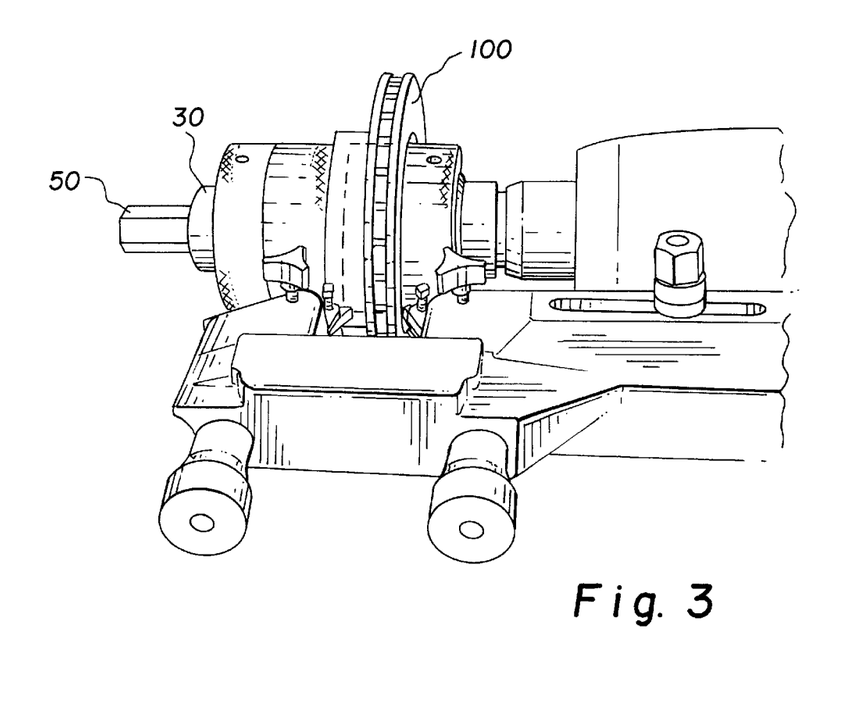
FIG. 3 is a perspective view of the brake lathe adapter shown in FIG. 2 taken from the opposite side.
Figure 4:
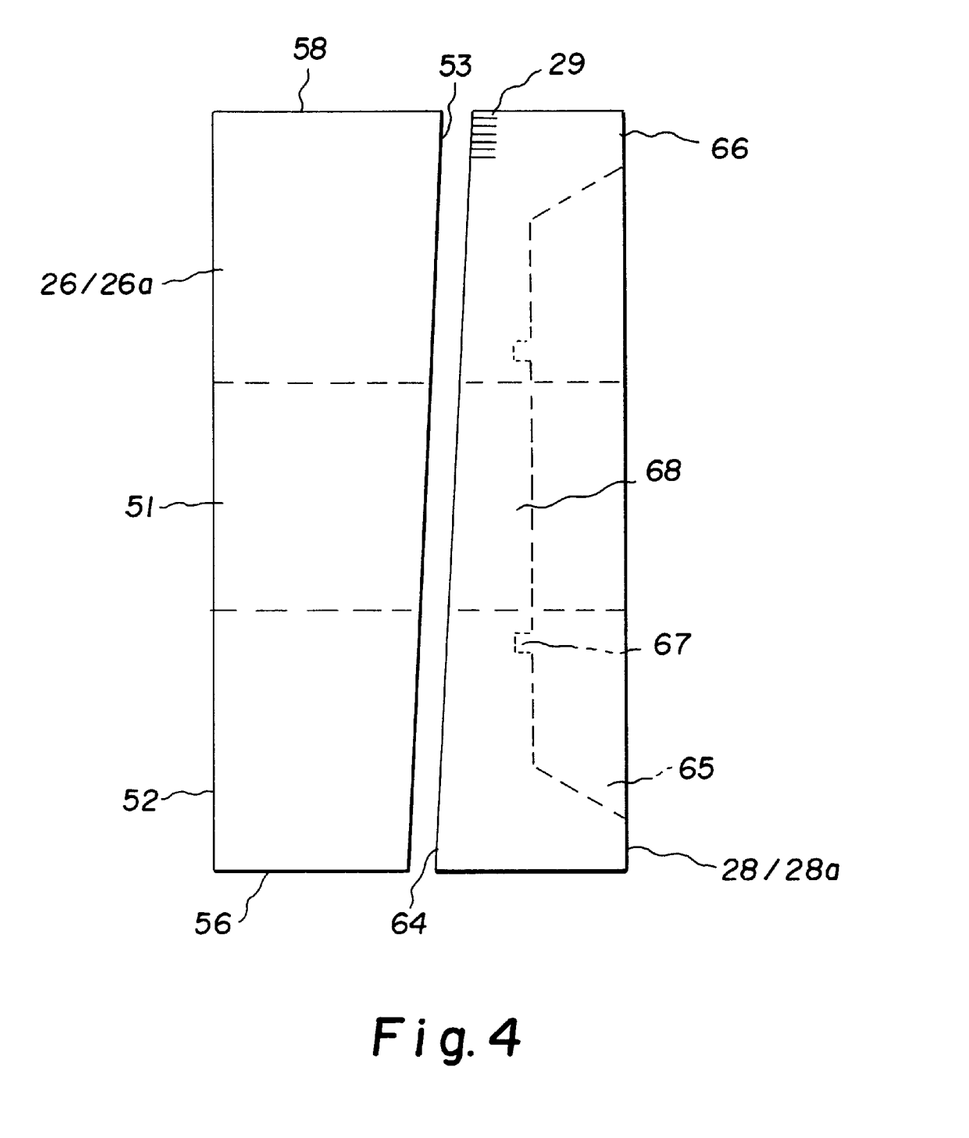
FIG. 4 is an enlarged exploded side elevational view of a paired plate assembly for the brake lathe adapter.
Figure 5:
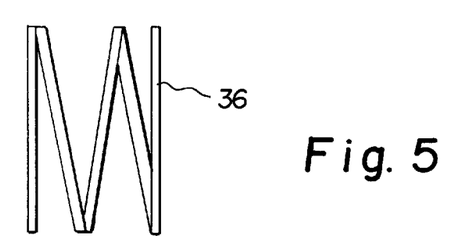
FIG. 5 is an enlarged side elevational view of an adapter spring member for the brake lathe adapter.
Figure 6:
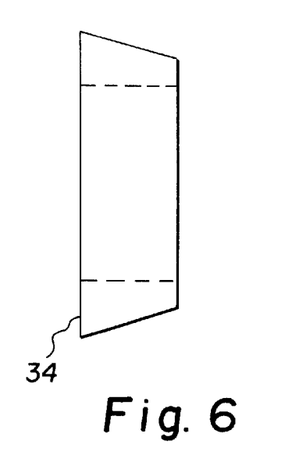
FIG. 6 is an enlarged side elevational view of a cone member for the brake lathe adapter.
Figure 7:
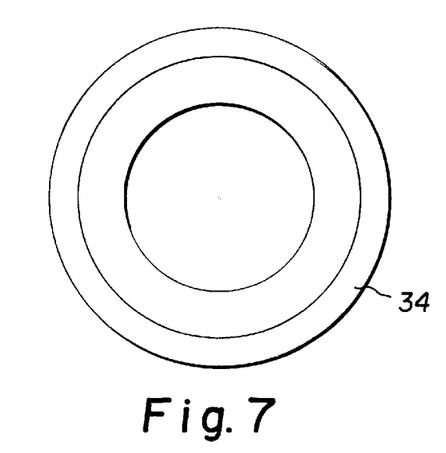
FIG. 7 is an end view of the cone member of FIG. 6.
Figure 8:
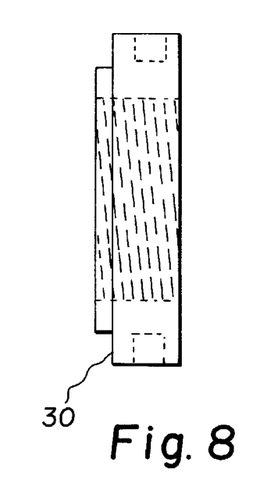
FIG. 8 is an enlarged side elevational view of a locking nut for the brake lathe adapter.
Figure 9:
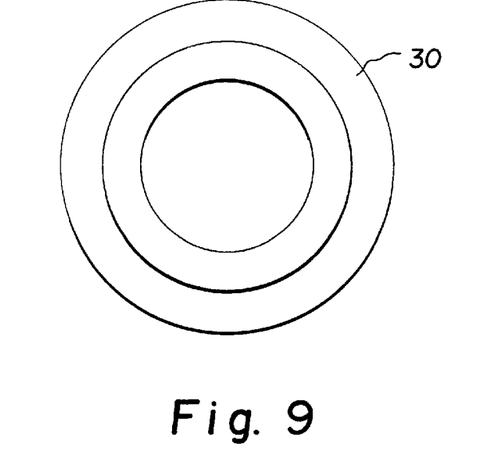
FIG. 9 is an end view of the locking nut of FIG. 7.
Figure 10:
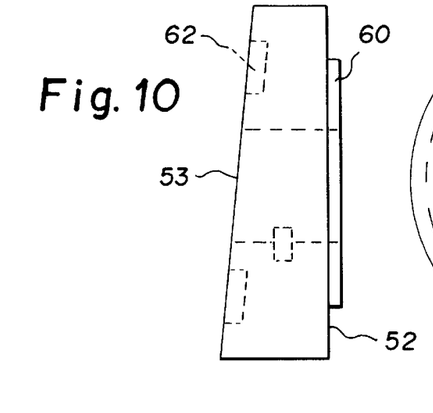
FIG. 10 is an enlarged side elevational view of a fixed plate member for the brake lathe adapter.
Figure 20:
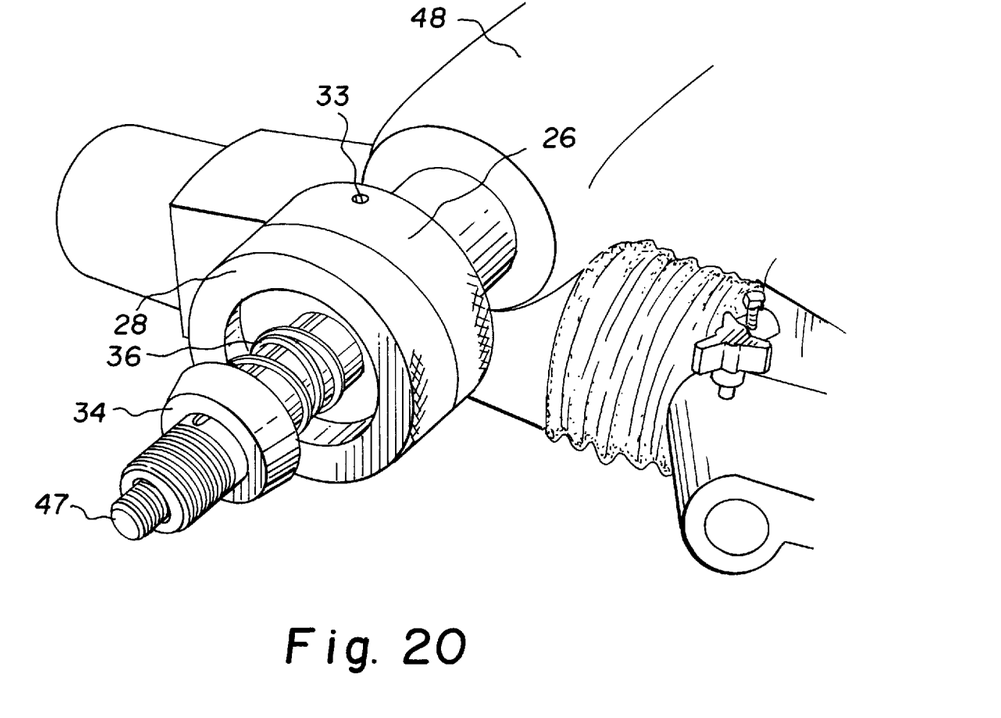
FIG. 20 is a perspective view of the spring and cone mounted on the adapter arbor.
Figure 21:
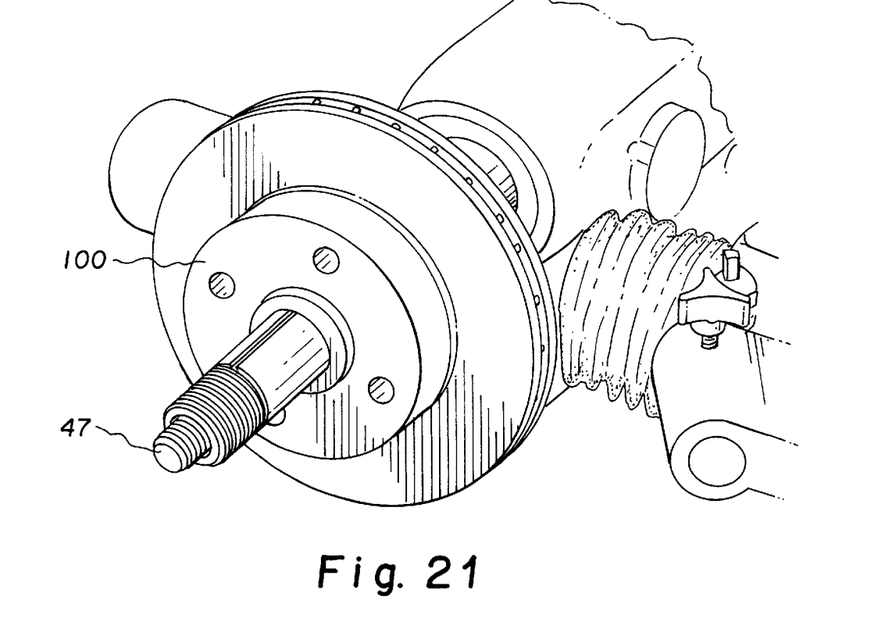
FIG. 21 is a perspective view of the brake disc mounted on the adapter arbor and cone shown in FIG. 20.
Figure 22:
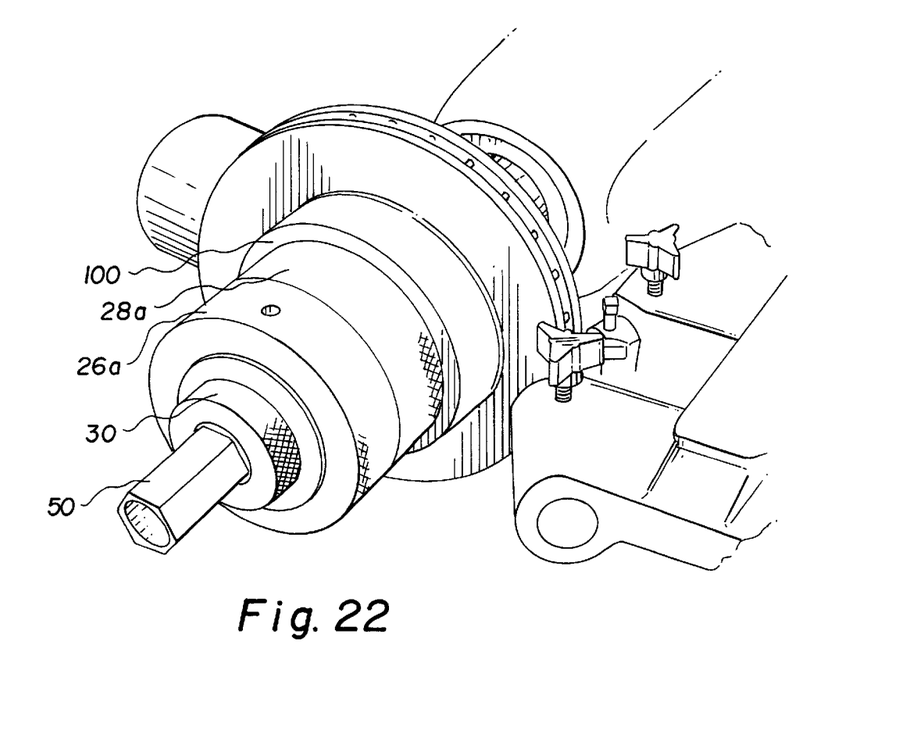
FIG. 22 is a perspective view of the second plate assembly mounted on the adapter arbor together with the spacer and a lock nut.

As is best seen in FIG. 1 and 22, a second similarly interengaged pair of plate members 26a and 28a are mounted toward the distal end of the adapter mounting arbor 24 so that the fixed plate member 26a is on the distal side of the rotatable plate member 28a and the non-angled perpendicular side of the fixed member is facing toward the distal end 40 of the adapter mounting arbor 24. An adapter spacer member 32 can be used and is positioned on the adapter mounting arbor 24 on the distal side of the fixed plate member 26a to compensate for different lengths of the adapter mounting arbor 24. An adapter locking nut 30 is threadedly engaged with the threaded distal end portion 40 of the adapter mounting arbor 24 holding a brake rotor 100 between the pairs 27 of plate members 26/26a and 28/28a. As best seen in FIGS. 2 and 20, a helically coiled tension spring member 36 and an adapter centering cone member 34 are mounted around the adapter mounting arbor and are generally positioned between the two movable plate members 28 and 28a. These two members 34 and 36 cooperate to properly center the brake rotor on the mounting arbor 24.

Operation of the Zero Run-Out Brake Lathe Adapter

The zero run-out brake lathe adapter can be used to eliminated disc rotor run-out and zero out the stacked tolerances of the hub and rotor assembly that cause run-out to prevent a recurrence of the problem. The goal of the brake resurfacing operations performed using the zero run-out brake lathe adapter is to have the brake pad contacting surfaces of each brake rotor move within a single plane that is perpendicular to their axis of rotation. The brake surfaces can fail to achieve this planar motion either because they are not perpendicular to the axis or structural linear member on which they are mounted or because the longitudinal center line of the linear member on which they are mounted does not for some reason coincide with the axis of rotation of the linear member. This can happen, for example, if the linear member on which they are mounted is not straight. If the brake surfaces do not travel in a single plane, they will appear to wobble when they are in rotational motion. An effective method to solve this problem is to check each rotor for these deviations before they are removed from the vehicle, mark the high spot of the non perpendicular disc surface, mark the rotor and a fixed location or the vehicle so that the rotor can be removed from the vehicle and then reinstalled to have the same orientation on the hub that it had before it was removed. The rotor is mounted can a lathe that is able to duplicate the stacked tolerances of the hub and rotor and the pad contacting surface of the rotor is cut so that it maintains a planar configuration while it is in motion on the hub.

Before the technician removes a brake rotor from a vehicle, lie or she first uses a dial indicator to take a run-out reading on the rotor and if the measurements indicate an excessive amount of run-out, the technician will indicate the high spots on the rotor with a marker. Before the rotor is removed for repair, the technician locates a common stud on the hub and marks it accordingly to enable the technician to realign the rotor the way it was mounted before it was removed from the vehicle. Once the vehicle is marked to enable proper realignment, the technician will remove the rotor and assemble it on the brake lathe using the zero run-out adapter.

First, the adapter mounting arbor 24 is mounted on the brake lathe shaft 46. Then the first adapter fixed offset plate 26 is placed on the arbor so that key 54 is placed in key way 44. The set screw 33 is tightened locking the fixed offset plate 26 on the mounting arbor 24. The first adapter movable offset plate 28 is placed or the arbor as described above. The first and second plates are initially mounted so that the zero position indicator groove 58 on the fixed plate member and the 0.000 inch line on the notched indicia 29 of the movable plate member are linearly aligned. Next, the technician rotates the movable plate 28 so that the run-out measurement recorded from the examination of the rotor on the vehicle before it was removed from the vehicle is aligned with the zero position indicator groove on the fixed plate member. In other words, the run-out value that the technician observed on the dial indicator while performing the run-out check or, the vehicle will be the value that he will index at the indicator grooves on the two fixed plate members. For example, if the adapter indicated that the run-out on the vehicle was 0.015 inch, then the technician would rotate the movable plate member until the 0.015 inch indicator notch aligns with the fixed zero indicator groove 58 on the fixed plate member. This alignment procedure will simulate the run-out measured on the vehicle.

The adapter tension spring member 36 and the adapter centering cone member 34 are placed on the adapter mounting arbor so that the proximal end coil of the spring member is seated within the annular groove 67 located in recess 65 of the movable plate member 28. The spring member is positioned to bias the cone member 34 into a central opening in the brake rotor 100 to center the rotor on the adapter mounting arbor 24. The centering cone member 34 is provided in a variety of sizes to accommodate a wide range of central bore diameters of the rotors 100.

Preferably a series of five cones 34 are used with the invention and have the following ranges of dimensions, with dimension A being the diameter in inches of the top of the cone and dimension B being the diameter in inches of the cone at its base:

|    | A    | B    |
|----|------|------|
| 1. | 1.84 | 2.20 |
| 2. | 2.12 | 2.48 |
| 3. | 2.38 | 2.75 |
| 4. | 2.65 | 3.03 |
| 5. | 2.93 | 3.30 |

The technician will then mount the marked rotor on the selected centering cone that is mounted on the adapter mounting arbor. Next, the technician will mount the second movable and second fixed plate members 28a/26a as previously described. These second movable and fixed plate members designated by the letter a, are identical in structure and operation to the first movable and fixed plate members. In keeping with the example given above, the technician will then align the 0.015 inch notch on the second movable plate member with the zero indicator groove on the second fixed plate member. Then the technician will align the 0.015 inch notch on the second movable plate member to the indication mark that he or she made on the rotor earlier. This indicator mark is the mark that the technician made to indicate the high spot in the rotor. Finally, the technician will install the adapter spacer 32 as required onto the arbor 24 and secure the brake lathe assembly by mounting adapter locking nut 30 on the threaded portion 40 of the adapter mounting arbor. End nut 50 is then threaded on shaft 46 to lock the assembly onto the lathe arbor.

The technician then cuts the rotor surface in accordance with the lathe manufacturer's described procedures. When the rotor surface has been cut to the proper finish, the technician will then reinstall the rotor on the vehicle aligning the indicated stud to its respective hole.

In the foregoing description, the invention has been described with reference to a particular preferred embodiment, although it is to be understood that specific details shown are merely illustrative, and the invention may be carried out in other ways without departing from the true spirit and scope of the following claims:

What is claimed is:

1. A lathe adapter for adapting a brake lathe to reshape the surfaces of a brake rotor eliminating run-out, comprising:
    an adapter mounting member mounted to a shaft of said brake lathe; said adapter mounting member being able to receive and hold a brake rotor;
    a first plate assembly mounted on said adapter mounting member;
    a second plate assembly mounted on said adapter mounting member;
    each plate assembly comprising a fixed plate fixedly mounted on said adapter mounting member and an adjacent moveable plate moveably mounted on said adapter mounting member;
    retaining means for retaining the first and second fixed plates on said adapter mounting member;
    indicator means on each moveable and fixed plate for indicating the degree of rotation of each movable plate in relation to the respective fixed plate required to correct a specified amount of brake run-out; and
    centering means mounted between the first and second plate assemblies for centering a brake rotor about the adapter mounting member.

2. A lathe adapter as claimed in claim 1 wherein the fixed plate and adjacent moveable plate of each plate assembly have opposing surfaces which are angled with respect to a perpendicular plane from the axis of the adapter mounting member.

3. A lathe adapter as claimed in claim 1 wherein said adapter mounting member is a tubular member proved with a threaded end and a base plate at the other end.

4. A lathe adapter as claimed in claim 1 wherein said moveable plate defines a recess at one end with a circular groove formed in said recess.

5. A lathe adapter as claimed in claim 1 wherein said centering means comprises a cone member defining a throughgoing bore and a spring member which biases said cone member.

6. A lathe adapter as claimed in claim 2 wherein plate opposing surfaces are angled from about 1° to about 5° with respect to said perpendicular plane.

7. A lathe adapter as claimed in claim 2 wherein plate opposing surfaces are angled to about 1° with respect to said perpendicular plane.

8. A lathe adapter as claimed in claim 1 wherein indicator means comprise marking grooves on an outside surface of each pair of fixed and moveable plates.

9. A lathe adapter as claimed in claim 1 wherein said retaining means is a key way on said adapter mounting member and a key on said fixed plate.

10. A lathe adapter as claimed in claim 1 wherein each fixed plate and moveable plate are circular in configuration with a planar end surface.

11. A lathe adapter for adapting a brake lathe for reshaping the surfaces of a brake rotor and eliminating run-out, comprising:
- an adapter mounting member comprising a longitudinal shaft portion allowing said brake rotor to be mounted thereon and a base portion secured to an end of said longitudinal shaft portion;
- a first fixed plate defining a first planar end surface and a second planar end surface that forms an angle of about one degree with a perpendicular plane drawn through the axis of said adapter mounting member, said first fixed plate being secured on said adapter mounting member;
- a first movable plate moveably mounted on said adapter mounting member and defining a first planar end surface and a second planar end surface that forms an angle of about one degree with a perpendicular plane drawn through the axis of said adapter mounting member with the angled end surface of the first movable plate member being adjacent and in connect with the angled end surface of the first fixed plate;
- said first moveable plate and said first fixed plate forming a plate assembly;
- a second plate assembly comprising a fixed plate and moveable plate having end surface substantially identical to the plates of said first plate assembly;
- retaining means for retaining the plate assemblies on said adapter mounting member;
- indicator means on each moveable and fixed plate for indicating the degree of rotation to correct a specified amount of brake run-out; and
- centering means mounted to the adapter mounting member between the first and second plate assemblies for centering a brake rotor which will be mounted between said plate assemblies.

12. A lathe adapter for adapting a brake lathe for reshaping the surfaces of a brake rotor and eliminating run-out as claimed in claim 11 wherein said adapter mounting member defines a throughgoing lumen extending from the base portion to the distal end of the longitudinal portion which lumen receives the arbor of said brake lathe so that a threaded end of the arbor extends out of the distal end of the lumen to receive an arbor nut.

13. A lathe adapter for adapting a brake lathe for reshaping the surfaces of a brake rotor and eliminating run-out as claimed in claim 12 wherein said first and second fixed plates and said first and second movable plates define cylindrical exterior surfaces.

14. A lathe adapter for adapting a brake lathe for reshaping the surfaces of a brake rotor and eliminating run-out as claimed in claim 13 wherein said indicator means comprises a longitudinal groove on each of the first and second fixed plates and a plurality of equally spaced longitudinal parallel lines representing tun out measurements on each of the first and second movable plates.

15. A lathe adapter for adapting a brake lathe for reshaping the surfaces of a brake rotor and eliminating run-out as claimed in claim 14 wherein when a planar end of said first fixed plate member and a planar end of said first movable plate member are parallel and the indicator groove on each fixed plate member is longitudinally aligned with a designated indicator line on each movable plate member.

16. A lathe adapter for adapting a brake lathe for reshaping the surfaces of a brake rotor and eliminating run-out as claimed in claim 11 wherein said centering means comprises a centering cone defining a conical exterior surface and a throughgoing bore dimensioned to receive the longitudinal portion of the adapter mounting member and adapted to be slidably mounted on the adapter mounting member so that the conical exterior is directed into a center bore in the brake rotor and a spring member mounted on the adapter mounting member and seated on first movable plate biases the centering cone into a center bore in the brake rotor.

17. A lathe adapter for adapting a brake lathe for reshaping the surfaces of a brake rotor and eliminating run-out as claimed in claim 11 wherein said adapter mounting member further includes a threaded exterior portion on a distal end thereof and and including an adapter locking nut threadably engaged with said threaded exterior portion on said adapter mounting member.

18. A lathe adapter for adapting a brake lathe for reshaping the surfaces of a brake rotor and eliminating run-out as claimed in claim 11 including a spacer means in the form of an annular ring defining a central bore mounted on said adapter mounting member.

19. A lathe adapter for adapting a brake lathe for reshaping the surfaces of a brake rotor and eliminating run-out, comprising:
- a rotatable mounting member rotationally mounted to the brake lathe;
- plate means for positioning a brake rotor mounted on the rotatable mounting member to reproduce a measured run-out value for the brake rotor;
- said plate means comprising two plate assemblies for orientating a brake rotor, each plate assembly comprising a first plate defining an angled end surface fixedly mounted on said rotatable mounting member and a second plate defining an angled end surface rotatable mounted on said rotatable mounting member, said first and second plates being mounted so that the angled end surfaces are facing each other and rotor attachment means for mounting a brake rotor on said rotatable mounting member in a retained position for eliminating run out when the lathe engages the brake rotor to cut the same to perpendicular.

20. A method for eliminating run-out in a brake rotor comprising the steps of:

measuring the degree of run-out on a vehicle brake rotor while the brake rotor is still installed on a vehicle;

marking a high spot on the brake rotor surface and a fixed location of the brake rotor on a vehicle hub;

orienting and mounting the brake rotor on a brake lathe arbor to duplicate the orientation of the brake rotor on the vehicle;

resurfacing the brake rotor on the brake lathe arbor so that each brake rotor braking surface is substantially perpendicular to an axis of rotation of the brake lathe arbor; and replacing the brake rotor on the vehicle so that it has the same orientation on the vehicle hub that it had before it was removed and resurfaced.

* * * * *